(12) United States Patent
Sumasu et al.

(10) Patent No.: US 7,839,759 B2
(45) Date of Patent: Nov. 23, 2010

(54) RADIO COMMUNICATION APPARATUS AND RADIO COMMUNICATION METHOD

(75) Inventors: Atsushi Sumasu, Yokosuka (JP); Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 1268 days.

(21) Appl. No.: 10/450,566

(22) PCT Filed: Jul. 5, 2002

(86) PCT No.: PCT/JP02/06873

§ 371 (c)(1), (2), (4) Date: Jun. 16, 2003

(87) PCT Pub. No.: WO03/005617

PCT Pub. Date: Jan. 16, 2003

(65) Prior Publication Data

US 2004/0028007 A1    Feb. 12, 2004

(30) Foreign Application Priority Data

Jul. 5, 2001    (JP) .............................. 2001-204943

(51) Int. Cl.
H04J 9/00    (2006.01)
H04J 13/00    (2006.01)
H04B 7/216    (2006.01)

(52) U.S. Cl. .................. 370/204; 370/342; 370/479

(58) Field of Classification Search ................ 370/335, 370/342, 441, 203, 204, 206, 208, 210, 320, 370/344, 480; 375/140–143, 146, 260, 261, 375/285, 150, 152
See application file for complete search history.

(56) References Cited

U.S. PATENT DOCUMENTS 5,179,571 A * 1/1993 Schilling .................... 370/331
5,504,783 A * 4/1996 Tomisato et al. ............ 375/267

(Continued)

FOREIGN PATENT DOCUMENTS

EP    0963071 A1    12/1999

(Continued)

OTHER PUBLICATIONS

Japanese Office Action dated Jul. 13, 2004 with English translation.

(Continued)

*Primary Examiner*—Warner Wong
(74) *Attorney, Agent, or Firm*—Dickinson Wright PLLC

(57) ABSTRACT

The transmitting side is equipped with chip steering section 30 that performs a chip steering that shifts the allocation of N×M chip elements upon their respective subcarriers by one chip for every transmission unit in sequence, and the receiving side is equipped with a parallel/serial conversion section and an inverse chip steering section that rearranges the allocation of the chip elements shifted in chip steering section 30 back to original.

19 Claims, 17 Drawing Sheets

U.S. PATENT DOCUMENTS

| | | | |
|---|---|---|---|
| 5,646,935 A | | 7/1997 | Ishikawa et al. |
| 6,058,145 A | | 5/2000 | Komaki et al. |
| 6,097,714 A | * | 8/2000 | Nagatani et al. ............ 370/342 |
| 6,304,581 B1 | * | 10/2001 | Chen et al. .................. 370/479 |
| 6,381,233 B1 | | 4/2002 | Sunaga |
| 6,400,703 B1 | * | 6/2002 | Park et al. .................... 370/342 |
| 6,522,706 B1 | * | 2/2003 | Bahai et al. .................. 375/343 |
| 6,597,677 B1 | * | 7/2003 | Segawa ....................... 370/342 |
| 6,636,723 B1 | * | 10/2003 | Kitagawa et al. ............. 455/69 |
| 6,728,324 B1 | * | 4/2004 | Shan et al. ................... 375/346 |
| 6,856,625 B1 | * | 2/2005 | Shamsunder et al. ........ 370/394 |
| 6,868,108 B1 | * | 3/2005 | Clark .......................... 375/130 |
| 6,870,826 B1 | | 3/2005 | Ishizu |
| 6,891,792 B1 | * | 5/2005 | Cimini et al. ................ 370/206 |
| 6,934,342 B1 | * | 8/2005 | Ishii et al. .................... 375/316 |
| 6,980,539 B2 | * | 12/2005 | Hanada et al. ............... 370/342 |
| 7,161,895 B1 | * | 1/2007 | Sudo ........................... 370/204 |
| 7,263,084 B2 | | 8/2007 | Miyoshi ...................... 370/335 |
| 7,298,722 B2 | * | 11/2007 | Sudo ........................... 370/335 |
| 7,385,934 B2 | * | 6/2008 | Uehara et al. ................ 370/252 |
| 2001/0002905 A1 | * | 6/2001 | Funamori .................... 370/342 |
| 2001/0010686 A1 | * | 8/2001 | Kubo et al. .................. 370/335 |
| 2001/0033606 A1 | * | 10/2001 | Akopian et al. ............. 375/149 |
| 2002/0075907 A1 | * | 6/2002 | Cangiani et al. ............. 370/535 |
| 2002/0126740 A1 | * | 9/2002 | Giannakis et al. ........... 375/143 |
| 2002/0136176 A1 | * | 9/2002 | Abeta et al. ................. 370/335 |
| 2002/0172213 A1 | * | 11/2002 | Laroia et al. ................. 370/430 |
| 2002/0181421 A1 | * | 12/2002 | Sano et al. ................... 370/335 |
| 2003/0026200 A1 | * | 2/2003 | Fu et al. ....................... 370/208 |
| 2003/0076910 A1 | * | 4/2003 | Van Wechel et al. ........ 375/354 |
| 2008/0219211 A1 | * | 9/2008 | Franceschini et al. ....... 370/330 |

FOREIGN PATENT DOCUMENTS

| | | |
|---|---|---|
| EP | 1 065 804 | 1/2001 |
| EP | 1179904 A1 * | 2/2002 |
| JP | 7254915 | 10/1995 |
| JP | 08032552 | 2/1996 |
| JP | 9261763 | 10/1997 |
| JP | 10190609 | 7/1998 |
| JP | 11186990 | 7/1999 |
| JP | 2000092009 | 3/2000 |
| JP | 2000-332724 | 11/2000 |
| JP | 2000332724 | 11/2000 |
| JP | 2002190788 | 7/2002 |

OTHER PUBLICATIONS

International Search Report dated Oct. 15, 2002.
Japanese Office Action dated Oct. 5, 2004 with English translation.
Supplementary European Search Report dated Dec. 8, 2009.

* cited by examiner

|  | SUBCARRIER 1 | SUBCARRIER 2 | SUBCARRIER 3 | SUBCARRIER 4 |
|---|---|---|---|---|
| PN1 | +1 | −1 | −1 | +1 |
| PN2 | −1 | +1 | −1 | +1 |

FIG.5

|  | SUBCARRIER 1 | SUBCARRIER 2 | SUBCARRIER 3 | SUBCARRIER 4 |
|---|---|---|---|---|
| Rx1 | +0.5 | +2 | −3 | +0.1 |
| Rx2 | +0.5 | −2 | −3 | −0.1 |

FIG.6

|  | SUBCARRIER 1 | SUBCARRIER 2 | SUBCARRIER 3 | SUBCARRIER 4 |
|---|---|---|---|---|
| PN1 | −1 | −1 | +1 | +1 |
| PN2 | +1 | −1 | +1 | −1 |

FIG.10

|  | SUBCARRIER 1 | SUBCARRIER 2 | SUBCARRIER 3 | SUBCARRIER 4 |
|---|---|---|---|---|
| Rx1 | −0.5 | +2 | +3 | +0.1 |
| Rx2 | +0.5 | +2 | +3 | −0.1 |

FIG.11

RADIO COMMUNICATION APPARATUS AND RADIO COMMUNICATION METHOD

FIELD OF THE INVENTION

The present invention relates to wireless communication apparatus and wireless communication methods for use in digital communication systems. More particularly, the present invention relates to a wireless communication apparatus and a wireless communication method that combine a multicarrier modulation scheme such as an OFDM (Orthogonal Frequency Division Multiplexing) modulation scheme with a CDMA (Code Division Multiple Access) scheme to perform communication.

BACKGROUND ART

In recent years, in wireless communication, and particularly in mobile communication, a variety of information other than speech, for instance images and data, have become subject to transmission. A surge in the future is foreseen in the demand for transmission of a variety of contents, and along with this the need for highly reliable and high-speed transmission is growing. Nevertheless, when high-speed transmission is performed in mobile communication, it is still difficult to ignore the impact of delayed waves caused by multi-path, and the deterioration of transmission characteristics due to frequency selective fading is more than possible.

One variety of techniques to cope with frequency selective fading is multi-carrier modulation schemes such as OFDM modulation schemes. A multi-carrier modulation scheme is a technique whereby data is transmitted on a number of carrier waves (i.e. subcarriers), and the transmission speed is reduced to a degree where no frequency selective fading occurs, thereby enabling high-speed transmission.

According to OFDM modulation schemes, in particular, a number of subcarriers upon which data is allocated are orthogonal to each other, so that the efficiency of frequency use is the highest of all multi-carrier modulation schemes. Moreover, OFDM modulation schemes are implementable through relatively simple configurations. In view of these, OFDM modulation schemes are being discussed in various ways as a measure against frequency selective fading.

Another variety of the techniques to cope with frequency selective fading is spectrum spreading schemes. A spectrum spreading scheme is a technique whereby a signal is spread on a frequency axis using a spreading code called a PN code, thereby, through spreading gain, enhancing the degree of tolerance for interference. Spectrum spreading schemes include direct spreading schemes and frequency hopping schemes. Of these, the use of CDMA (Code Division Multiple Access) schemes that employ direct spreading schemes in IMT-2000, the next generation's mobile communication, has been decided.

Of late, furthermore, OFDM/CDMA schemes that combine these OFDM modulation schemes and CDMA schemes draw attention. These OFDM/CDMA schemes can be roughly classified into time domain spreading schemes and frequency domain spreading schemes. A conventional wireless communication apparatus of an OFDM/CDMA scheme that adopts frequency domain spreading will be described below.

FIG. 1 is a block diagram showing an overview configuration of the transmitting side of a conventional wireless communication apparatus, and FIG. 2 is a block diagram showing an overview configuration of the receiving side of the conventional wireless communication apparatus. Moreover, FIG. 3A shows signal ① in FIG. 1 in a schematic manner; FIG. 3B shows signal ② in FIG. 1 in a schematic manner; and FIG. 3C shows signal ③ in FIG. 1 in a schematic manner.

In FIG. 1, N digital symbols (FIG. 3A), which are a serial data sequence, are multiplied in spreading section 10 on a per symbol basis with a spreading code with the spreading factor of M. The chips (FIG. 3B) after the spreading are converted from serial data into parallel data through S/P (Serial/Parallel) conversion section 11, and, in IDFT section 12, N×M symbols are each subjected to inverse Fourier transform processing for in parallel and in sequence. As a result, N×M subcarriers of OFDM symbols are generated (FIG. 3C). In short, with a frequency domain spreading scheme, chips after spreading are each allocated on a frequency axis at discrete times. In other words, chips after spreading are each allocated upon different subcarriers. The N×M subcarriers of OFDM symbols generated in IDFT section 12 are power-amplified in radio transmission section 13, and then released into air through antenna 104.

In FIG. 2, the receiving side of the wireless communication apparatus performs processings that are inverse to the above processings of the transmitting side. That is, a signal received in radio receiving section 21 through antenna 20 is Fourier transformed in DFT section 22, thereby generating N×M chips. The N×M chips generated thus are corrected into a time sequence in P/S (Parallel/Serial) conversion section 23 and thereafter despread in despreading section 24, and N digital symbols, the received data, are obtained.

Meanwhile, conventional, OFDM/CDMA scheme-based wireless communication apparatus have a problem that, when fading is caused by multi-path with small temporal variations in the fading, the state of high correlation between spreading codes continues and makes the likelihood of the occurrence of burst errors high.

In this context, when temporal variations in fading are said to be small, this corresponds to where conditions such as ① and ② in FIG. 4 continue for a long time. In contrast, when temporal variations in fading are said to be large, this corresponds to where conditions such as ① and ② in FIG. 4 switch frequently.

It is commonly known that, when inter-code interference becomes large due to small temporal variations in fading, this condition will continue. When one data has error, it is possible to perform modulation correctly through error correction decoding. However, when a number of errors occur in sequence, the likelihood is very low that error correction decoding makes correct demodulation possible.

As described above, a burst error refers to an error in which data is lost continuously over a relatively long period of time, whereas a random error refers to an error in which data is lost over a relatively short period of time. When a random-type error occurs, performing error correction decoding such as described above makes the likelihood of correct demodulation high, whereas in case of a burst error, this likelihood of correct demodulation is quite low.

Next, the impact of fading due to multi-path will be described in detail.

For instance, assume that there are two spreading codes PN 1 and PN 2 shown below, that spread one bit of data in 4 chips. Here the spreading codes PN 1 and PN 2 are orthogonal to each other.

PN 1: +1, −1, −1, +1

PN 2: −1, +1, −1, +1

In addition, assume that the chips of these spreading codes are allocated upon four subcarriers 1-4 shown in FIG. 5.

Furthermore, assume that a signal transmitted in the arrangement shown in FIG. 5 receives the impact of multi-path fading, and the received signal becomes as shown in FIG. 6.

Rx 1: +0.5, +2, −3, +0.1
Rx 2: +0.5, −2, −3, −0.1

Assume, in other words, that a signal is received in which subcarrier 1 is weighted by 0.5 times, subcarrier 2 is weighted by −2 times, subcarrier 3 is weighted by 3 times, and subcarrier 4 is weighted by 0.1 times. The negative weighting indicates phase inversion.

Assuming that the signal transmitted with the spreading code PN 1 becomes the received signal Rx1, when this signal is despread with the spreading code PN 1, the autocorrelation will be:

$$(+0.5) \times (+1) + (+2) \times (-1) + (-3) \times (-1) + (+0.1) \times (+1) = 0.5 - 2 + 3 + 0.1 = 1.6 \quad \text{Equation 1}$$

On the other hand, if the received signal Rx 1 is despread with the spreading code PN 2, the cross correlation element will be as follows:

$$(+0.5) \times (-1) + (+2) \times (+1) + (-3) \times (-1) + (+0.1) \times (+1) = -0.5 + 2 + 3 + 0.1 = 4.6 \quad \text{Equation 2}$$

The resultant cross correlation value from the above second equation is large relative to the resultant autocorrelation value of the above first equation, and so the likelihood is high that a signal transmitted with the spreading code PN 1 is mistaken for a signal transmitted with the spreading code PN 2 and received as such. In case of large temporal variations in fading, the likelihood is high that the condition of fading changes when the next OFDM/CDMA symbols is transmitted, and the relationship between autocorrelation and cross correlation values improves. Still, in case of small temporal variations in fading, the condition prolongs where the impact of fading due to multi-path causes errors, thereby causing burst errors.

SUMMARY OF THE INVENTION

It is therefore one of the primary objects of the present invention to provide a wireless communication apparatus and a wireless communication method that minimize the occurrence of burst errors even where multi-path causes fading with small temporal variations in the fading.

By performing chip steering that shifts the allocation of chip elements on respective subcarriers by a predetermined number of chips for every transmission unit, even when fading fluctuations are relatively small, it is possible to prevent prolonged conditions of high cross correlation between spreading codes and minimize burst errors, thereby achieving the above-noted object.

BRIEF DESCRIPTION OF DRAWINGS

FIG. 5 illustrates problem in conventional wireless communication apparatus;
FIG. 6 illustrates problem in conventional wireless communication apparatus;
FIG. 10 illustrates chip steering processing in the wireless communication apparatus according to Embodiment 1;
FIG. 11 illustrates chip steering processing in the wireless communication apparatus according to Embodiment 1.

DETAILED DESCRIPTION OF THE PREFERRED EMBODIMENTS

Preferred embodiments of the present invention will be described below with reference to the accompanying drawings.

Embodiment 1

Figure 7:
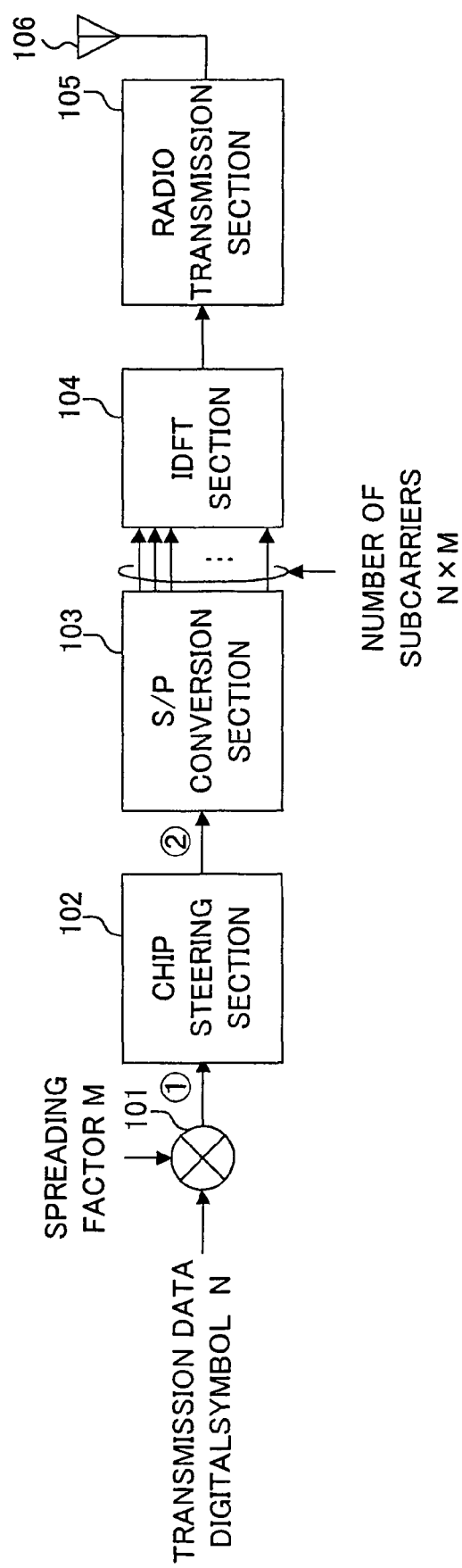
FIG. 7 is a block diagram showing an overview configuration of the transmitting side of the wireless communication apparatus according to Embodiment 1 of the present invention.

FIG. 7 is a block diagram showing an overview configuration of the transmitting side of the wireless communication apparatus under Embodiment 1 of the present invention. The wireless communication apparatus of the present embodiment is mainly for use with mobile telephones and their base stations and the like.

The wireless communication apparatus of FIG. 7 consists chiefly of a spreading section 101, a chip steering section 102, an S/P (Serial/Parallel) conversion section 103, an IDFT section 104, a wireless transmission section 105, and an antenna 106.

In FIG. 7, spreading section 101 multiplies digital symbols, which are transmission data, by a spreading code with the spreading factor of M, and outputs the spread transmission data to chip steering section 102.

Chip steering section 102 shifts the allocation of the chip elements by one chip for every transmission unit in sequence and thus performs the chip steering of the transmission data.

Then, chip steering section 102 outputs the transmission data to S/P conversion section 103.

To be more specific, chip steering section 102, when allocating the M×N chip elements obtained from spreading section 101 to respective corresponding subcarriers, performs a chip steering that shifts the allocation of the chip elements to the respective subcarriers.

S/P conversion section 103 converts the transmission data from serial data to parallel data and thereafter outputs the transmission data to IDFT section 104. IDFT section 104 performs the inverse Fourier transform of the transmission data and thereafter outputs the transmission data to wireless communication section 105. Wireless communication section 105 converts the transmission data into a radio frequency which is then transmitted from antenna 106.

The wireless communication apparatus of FIG. 7 performs chip steering by the above configuration. Next, the chip steering of the wireless communication apparatus of the present embodiment will be described.

Figure 8:
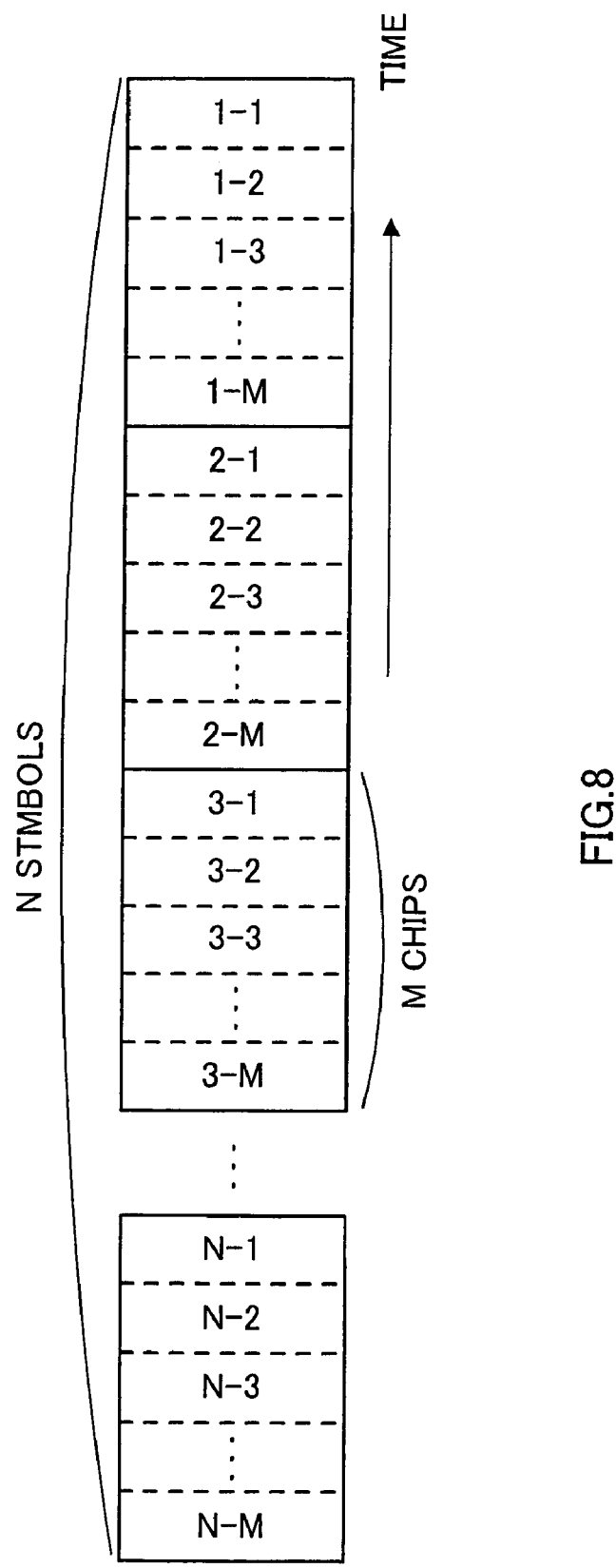
FIG. 8 illustrates chip steering processing in the wireless communication apparatus according to Embodiment 1.
Figure 9:
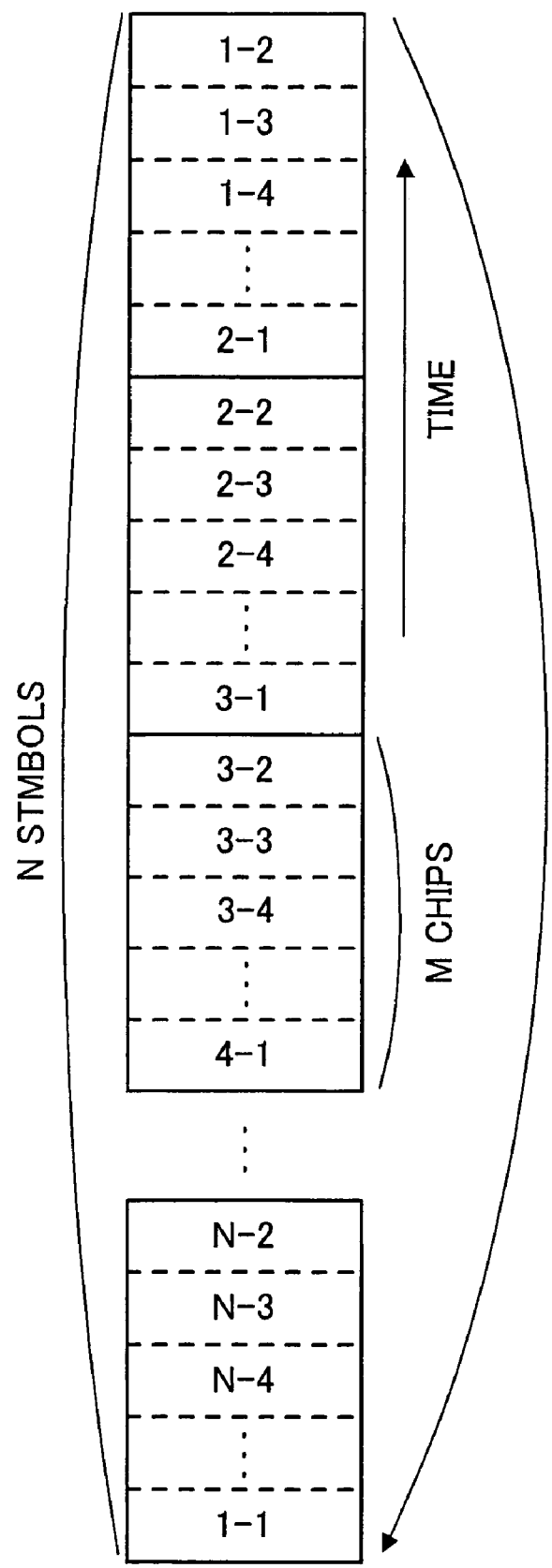
FIG. 9 illustrates chip steering processing in the wireless communication apparatus according to Embodiment 1.

FIG. 8 shows the arrangement of M×N chip elements obtained from spreading section 101, and FIG. 9 shows the arrangement of the M×N chip elements rearranged in chip steering section 102. As shown in these figures, the data of N symbols is rearranged through chip steering section 102 such that the top chip element (i.e., the chip element numbered as 1-1, which is the oldest in time) is rearranged at the end, and the other chip elements are shifted forward by one. Then, the rearranged chip elements are converted into OFDM symbols.

Now chip steering section 102 shifts N symbols of transmission data which is to be transmitted next by 2 chips, and furthermore shifts N symbols of data which is to be transmitted thereafter by 3 chips. Chip steering section 102 thus increases the degree of steering at which the arrangement of the symbols is shifted for every OFDM symbol unit.

For example, as describe above, the spreading codes PN1 and PN2 shown in FIG. 5 and shifted by one chip are arranged as shown in FIG. 10:

PN 1: −1, −1, +1, +1
PN 2: +1, −1, +1, −1

Since the spreading codes PN1 and PN 2 are both shifted by one chip in this case, they will remain orthogonal. Now a case will be assumed where a signal rearranged such as above will be transmitted after a signal is transmitted without shift by one-chip.

In case of small temporal variations in fading, the signal transmitted in the arrangement shown in FIG. 10 received with the same influence thereupon with FIG. 6. As a result, the received signal will be as shown in FIG. 11.

Rx 1: −0.5, +2, +3, +0.1
Rx 2: +0.5, +2, +3, −0.1

When the received signal Rx 1 of the signal transmitted with the spreading code PN 1 is despread with the spreading code PN 1, the autocorrelation will be 1.6 as in the above equation 1. On the other hand, if the cross correlation element is to be obtained where the received signal Rx 1 of the signal that is transmitted with the spreading code PN 1 is despread with the spreading code PN 2, the cross correlation element will be 0.4 as shown in Equation 3 given below:

$$(-0.5)\times(+1)+(+2)\times(-1)+(+3)\times(+1)+(+0.1)\times(-1)=$$
$$-0.5-2+3-0.1=0.4 \quad \text{Equation 3}$$

The value from Equation 3 is small relative to the value of Equation 1 of the above, so that the likelihood is low that a signal transmitted with the spread code PN 1 is mistaken for a signal transmitted with the spreading code PN 2 and received as such.

This value of 0.4 is small relative to the value of the autocorrelation value 1.6 shown by the first equation, so that the likelihood is low that a signal transmitted with the spread code PN 1 is mistaken for a signal transmitted with the spreading code PN 2. So, even when multi-path causes fading with relatively small temporal variations in the fading, the occurrence of burst errors can still be minimized.

By thus performing chip steering that shifts the allocation of M×N chip elements to respective subcarriers shifts by one chip for every transmission unit in sequence, it is possible to maintain the correlation between spreading codes even where fading is caused by multi-path, thereby minimizing burst-type errors.

Figure 12:
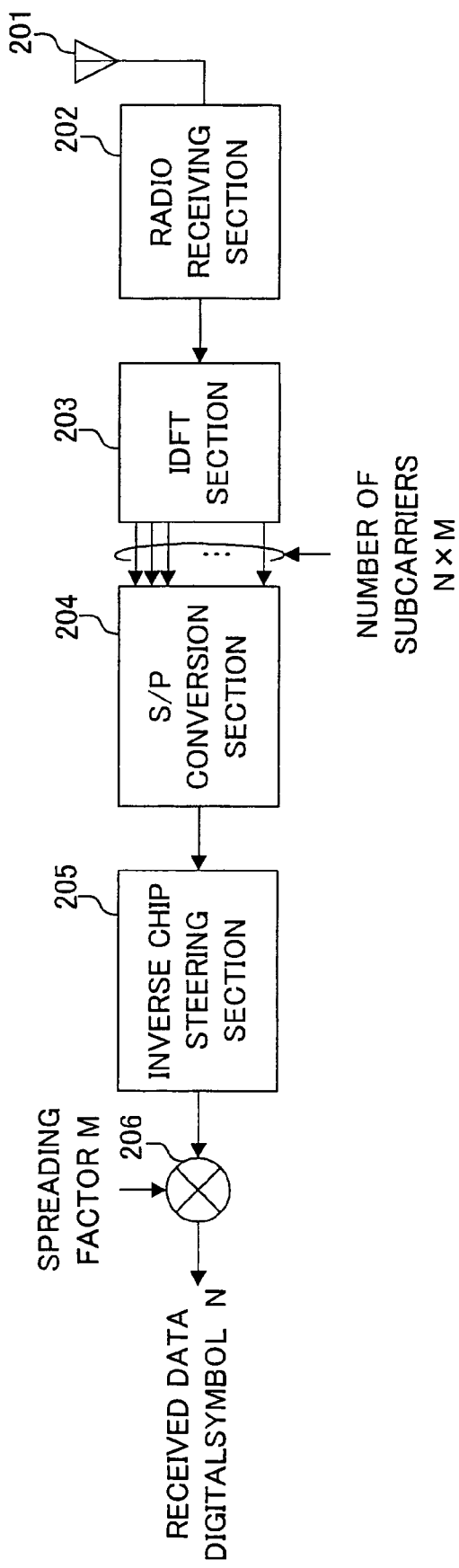
FIG. 12 is a block diagram showing an overview configuration of the receiving side of the wireless communication apparatus according to Embodiment 1.

Next, the receiving side will be explained. FIG. 12 is a block diagram showing an overview configuration of the receiving side of the wireless communication apparatus according to the present embodiment. The wireless communication apparatus of FIG. 12 consists chiefly of an antenna 201, a radio receiving section 202, a DFT section 203, a P/S conversion section 204, an inverse chip steering section 205, and a despreading section 206.

Radio receiving section 202 amplifies a radio signal received through antenna 201, converts the signal into a baseband frequency, and outputs the received data onto DFT section 203. DFT section 203 performs the Fourier transform of the received data, and then outputs the data to P/S conversion section 204.

P/S conversion section 204 converts the received data from parallel data into serial data and thereafter outputs the data to inverse chip steering section 205.

Inverse chip steering section 205 shifts the allocation of the chip elements by one chip for every transmission unit in sequence and thus performs the chip steering of the received data. By this operation inverse chip steering section 205 performs a processing that rearranges the allocation of chip elements upon subcarriers, which is shifted in chip steering section 102 of the transmitting side, back to original. For instance, if chip steering section 102 of the transmitting side has performed a shift by one chip, inverse chip steering section 205 performs a processing that corrects this. Then, inverse chip steering section 205 outputs the received data to despreading section 206.

Despreading section 206 multiplies the received data by a spreading code with the spreading factor of M and thus dispreads the received data.

As described above, the wireless communication apparatus of the present embodiment is configured such that the allocation of chip elements after spreading upon subcarriers is shifted by one chip for every transmission unit in sequence, so that the correlation between spreading codes can be maintained low even where variations in fading caused by multi-path small are small. As a result, burst-type errors can be minimized. It is therefore possible to provide a wireless communication apparatus that can enhance the quality of communication relative to the past.

Incidentally, the degree of shift is not limited to one chip, and, furthermore, a later chip can be brought forward. That is, the point is that the condition of transmission path with respect to each chip element changes as the arrangement of the chips change for every one OFDM symbol, and the method of rearrangement is optional. However, if these are rearranged on a random basis, the receiving side that restores them needs to be advised as to how they have been changed, which only complicates the processing. It is therefore preferable to determine the degree of shift in advance or shift stepwise. In otherwise, insofar as the initial chip position and the degree of shift are determined in advance, chips can be restored without every time instructing the receiving side as to these.

Embodiment 2

Figure 1:
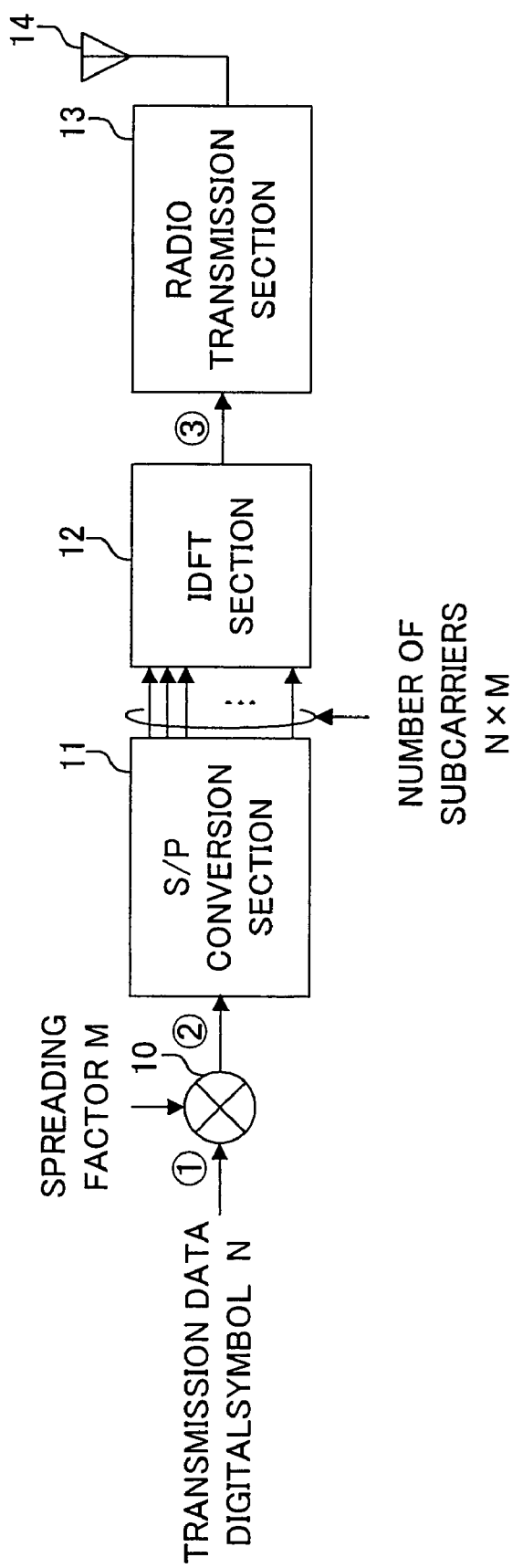
FIG. 1 is a block diagram showing an overview configuration of a transmitting side of a conventional wireless communication apparatus.
Figure 2:
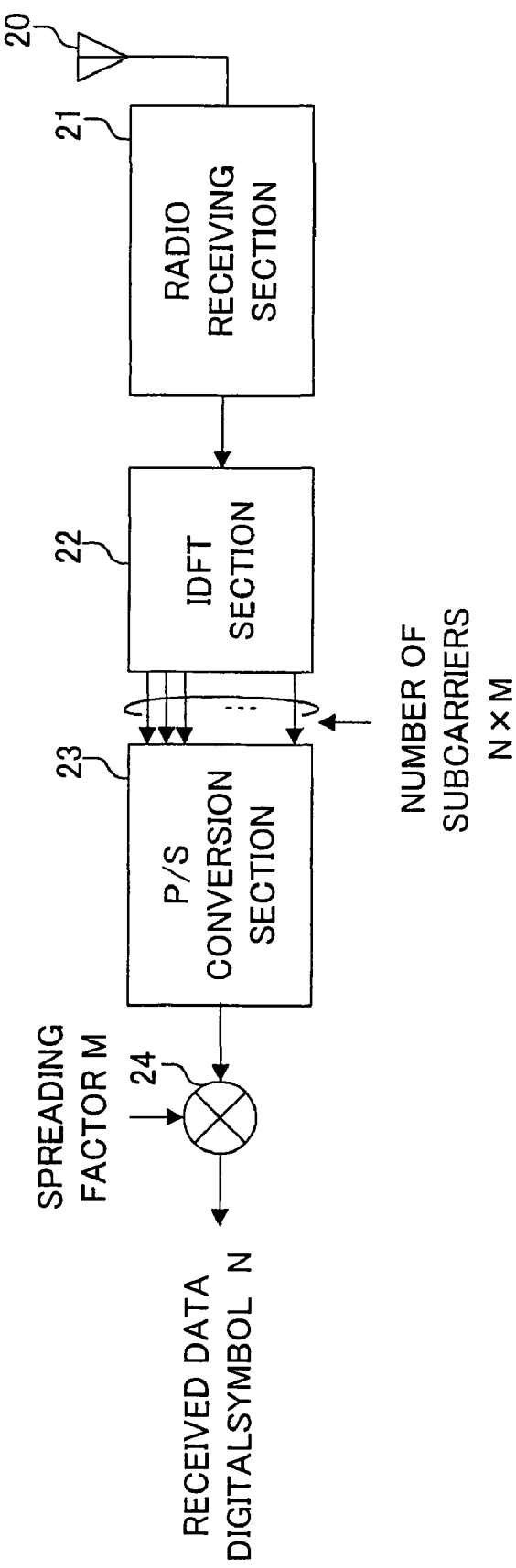
FIG. 2 is a block diagram showing an overview configuration of a receiving side of a conventional wireless communication apparatus.
Figure 3A:
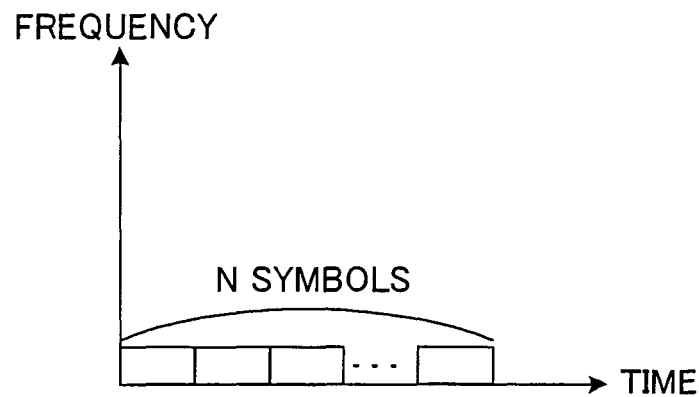
FIG. 3A illustrates multicarrier/CDMA scheme.
Figure 3B:
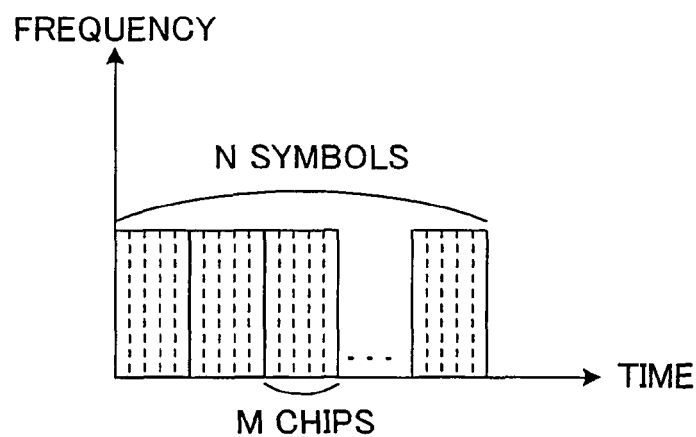
FIG. 3B illustrates multicarrier/CDMA scheme.
Figure 3C:
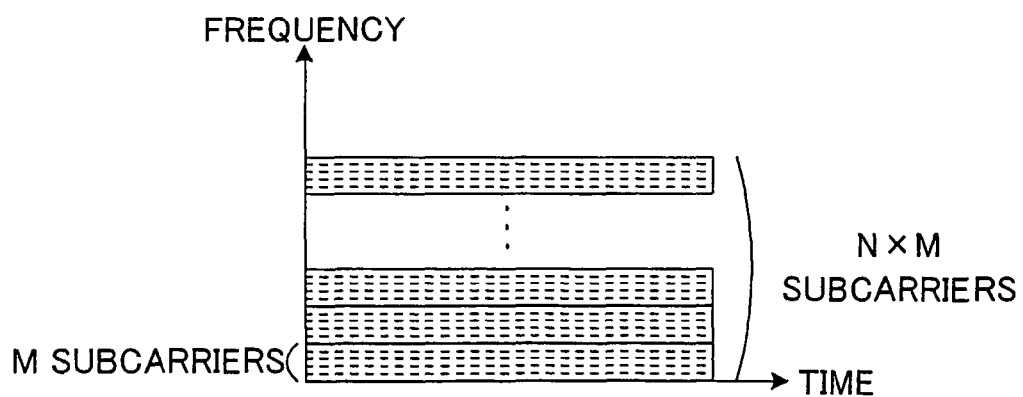
FIG. 3C illustrates multicarrier/CDMA scheme.
Figure 4:
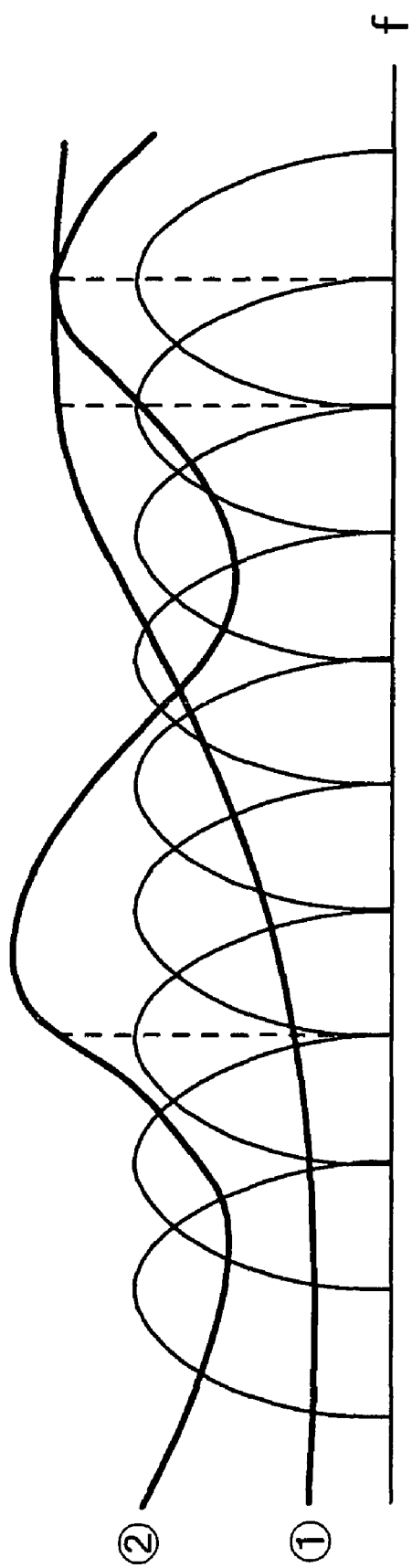
FIG. 4 illustrates problem in conventional wireless communication apparatus.

The above wireless communication apparatus of Embodiment 1 is configured to constantly perform chip steering. Now, the present embodiment is configured such that it performs chip steering when temporal variations in fading in received signals are small. Where temporal variations in fading are small, for instance where conditions such as ① and ② in FIG. 4 prolong, burst errors are more likely to occur.

Figure 13:
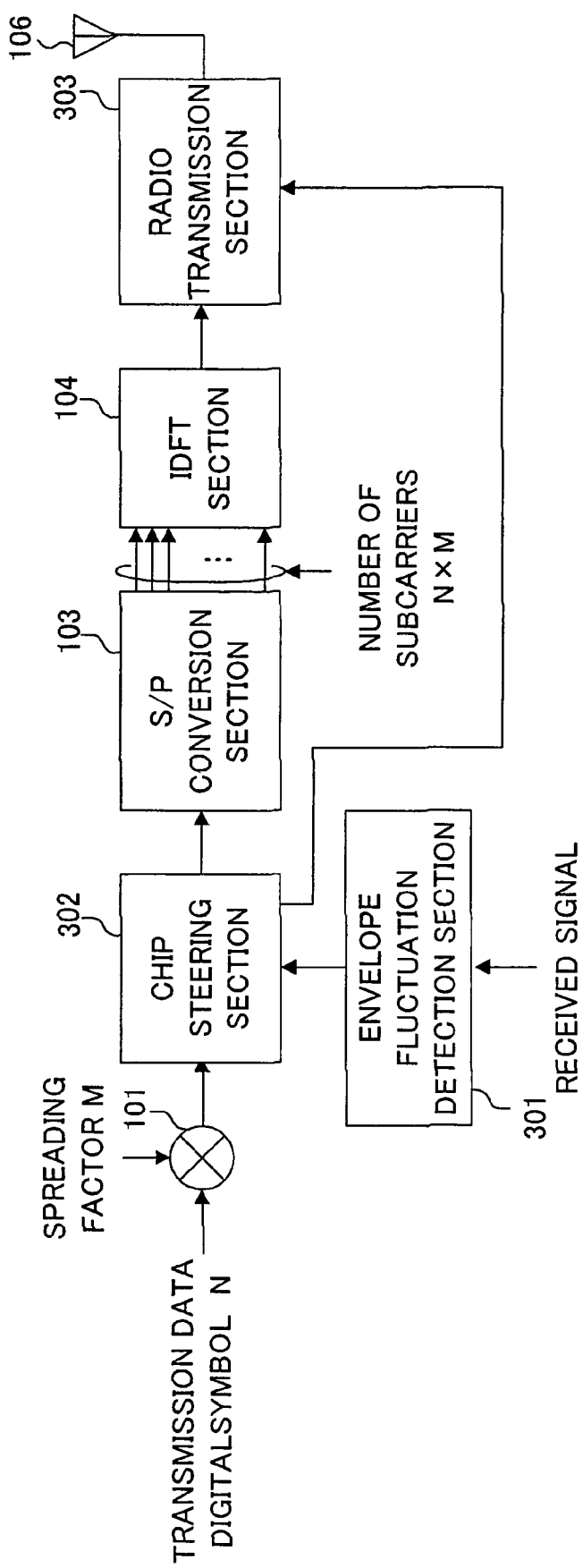
FIG. 13 is a block diagram showing an overview configuration of the transmitting side of the wireless communication apparatus according to Embodiment 2.

With Embodiment 2, chip steering processing is performed when temporal variations in fading are small. FIG. 13 is a block diagram showing an overview configuration of the transmitting side of the wireless communication apparatus according to Embodiment 2. Parts identical to those in FIG. 7 are assigned the same codes as in FIG. 7 without further explanations thereof.

The wireless communication apparatus of FIG. 13 comprises an envelope fluctuation detection section 301, a chip steering section 302, and a radio transmission section 303, and differs from the wireless communication apparatus of FIG. 7 in performing chip steering processing when temporal variations in fading in received signals are small.

In FIG. 13, envelope fluctuation detection section 301 detects envelope fluctuations of a pilot carrier in a received signal. For instance, envelope fluctuation detection section 301 observes the envelope of a pilot carrier for a number of samples and thus detects envelope fluctuations. Incidentally, it is also possible to detect envelope fluctuations from the slope of a pilot carrier's envelope.

Chip steering section 302 estimates the scale of temporal variations in fading from the envelope fluctuations of the pilot carrier detected in envelope fluctuation detection section 301. If the dynamics of the envelope are large during a given observation period, this means large temporal variations in fading, whereas if the dynamics of the envelope are small, this means small fading variations.

When the scale of temporal fading variations estimated above is below a predetermined level, chip steering section 302 performs chip steering. Here chip steering section 302 transmits a signal to the communication partner's wireless communication apparatus through radio transmission section 303, to the effect that chip steering processing has been performed.

As described above, according to the wireless communication apparatus of the present embodiment, the speed of fading variations can be estimated by detecting the Doppler frequency of a received signal, so that opportunities to perform chip steering can be determined.

Embodiment 3

Figure 14:
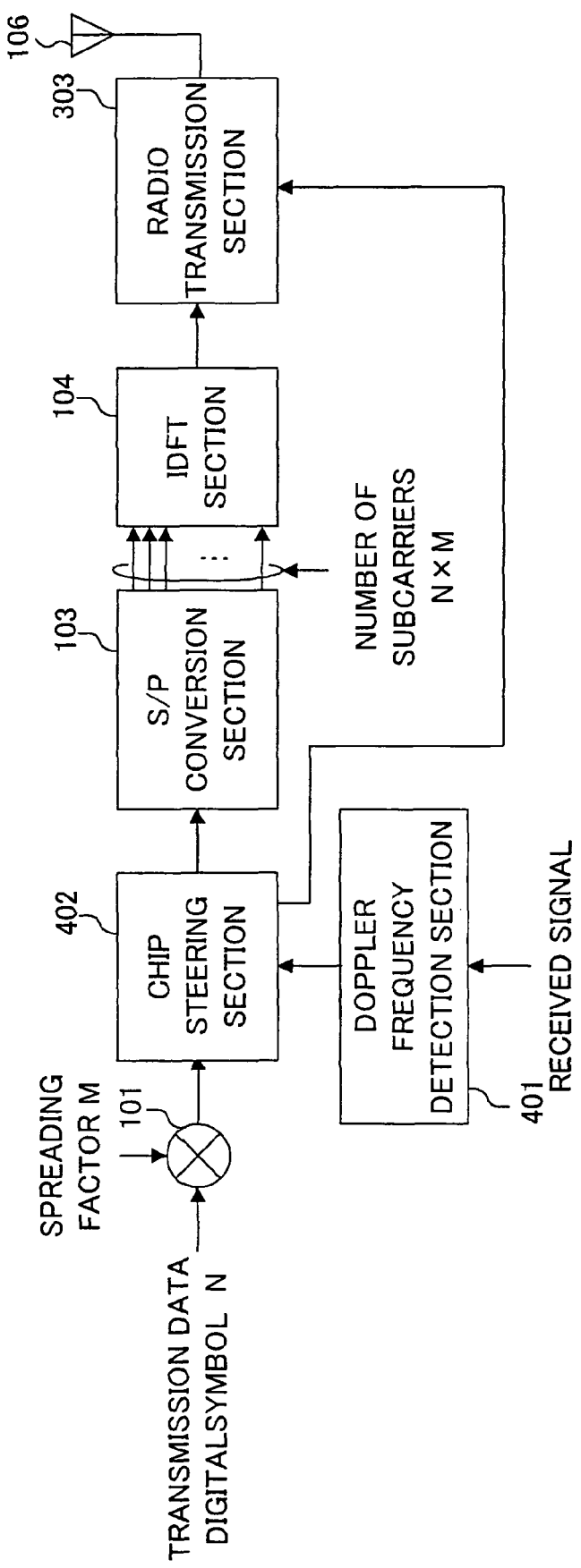
FIG. 14 is a block diagram showing an overview configuration of the transmitting side of the wireless communication apparatus according to Embodiment 3.

FIG. 14 is a block diagram showing an overview configuration of the transmitting side of the wireless communication apparatus according to Embodiment 3. Parts identical to those in FIG. 7 are assigned the same codes as in FIG. 7 without further explanations thereof.

The wireless communication apparatus of FIG. 14 comprises a Doppler frequency detection section 401 and a chip steering section 402, and differs from the wireless communication apparatus of FIG. 7 in estimating the speed of fading variation from the Doppler frequency of a received signal.

Doppler frequency detection section 401 detects the Doppler frequency of a received signal, and outputs this Doppler frequency to chip steering section 402. For example, Doppler frequency detection section 401 performs Doppler frequency detection from the measurement result on a speed meter mounted in the body of a mobile (not shown). Incidentally, Doppler frequency detection can also be performed in such a way that Doppler frequency is detected based on the fluctuation elements of channel estimation values estimated from the respective known signals of a number of received symbols.

Chip steering section 402 estimates the scale of temporal variations in fading based on the Doppler frequency detected in Doppler frequency detection section 401.

When the Doppler frequency is large, the temporal variations in fading are also large, and when the Doppler frequency is small, the temporal variations in fading are small.

The estimated scale of temporal variations in fading is below a predetermined level, chip steering section 402 performs chip steering. In such case, chip steering section 402 transmits a signal to the communication partner's wireless communication apparatus through radio transmission section 303, to the effect that chip steering has been performed.

As described above, according to the wireless communication apparatus of the present embodiment, the speed of fading variations can be estimated by detecting the Doppler frequency of a received signal, so that opportunities to perform chip steering can be determined.

Embodiment 4

Figure 15:
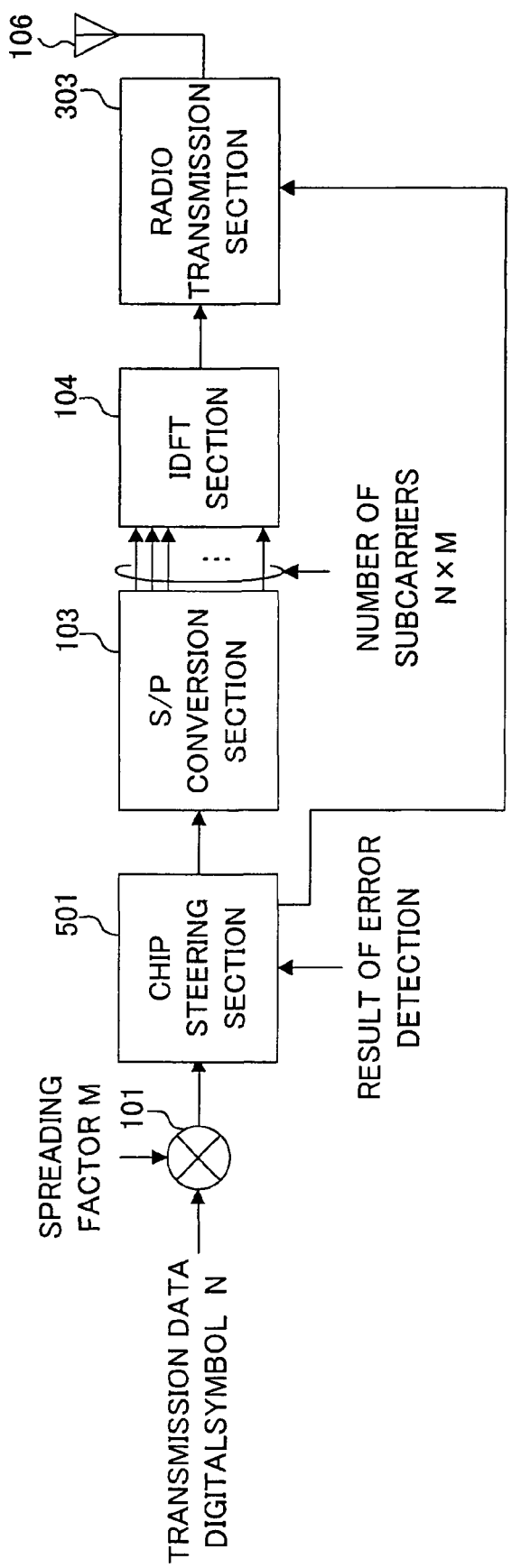
FIG. 15 is a block diagram showing an overview configuration of the transmitting side of the wireless communication apparatus according to Embodiment 4.

FIG. 15 is a block diagram showing an overview configuration of the transmitting side of the wireless communication apparatus according to Embodiment 4. Parts identical to those in FIG. 7 and FIG. 14 are assigned the same codes as in FIG. 7 and FIG. 14 without further explanations thereof.

The wireless communication apparatus of FIG. 15 comprises a chip steering section 501, and differs from the wireless communication apparatus of FIG. 7 and FIG. 14 in determining opportunities to perform chip steering based on the result of error detection obtained from the receiving side.

Chip steering section 501 receives error detection results from the receiving side, and, when errors continue, performs chip steering. Then, chip steering section 501 transmits a signal to the communication partner's wireless communication apparatus through radio transmission section 303, to the effect that chip steering has been performed.

As described above, according to the wireless communication apparatus of the present embodiment, opportunities to perform chip steering can be determined based on the result of error detection obtained from the receiving side. Moreover, according to the present embodiment, a signal that specifies as to whether or not chip steering is to be performed is transmitted in attachment to a transmission signal, so that the wireless communication apparatus receiving this signal is able to perform inverse chip steering with this signal.

Embodiment 5

Figure 16:
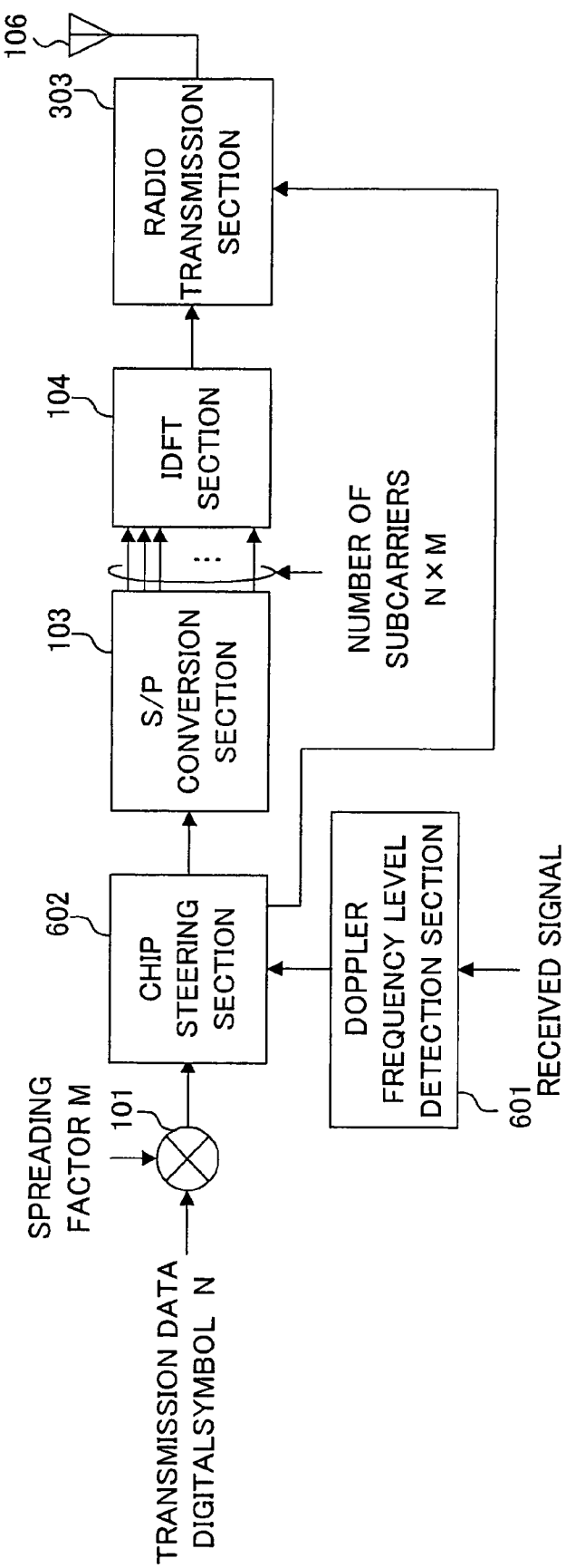
FIG. 16 is a block diagram showing an overview configuration of the transmitting side of the wireless communication apparatus according to Embodiment 5.

FIG. 16 is a block diagram showing an overview configuration of the transmitting side of the wireless communication apparatus according to Embodiment 5. Parts identical to those in FIG. 7 and FIG. 14 are assigned the same codes as in FIG. 7 and FIG. 14 without further explanations thereof.

The wireless communication apparatus of FIG. 16 comprises a Doppler frequency level detection section 601 and a chip steering section 602, and differs from the wireless communication apparatus of FIG. 7 and FIG. 14 in determining the degree of chip steering based on the Doppler frequency.

In FIG. 16, Doppler frequency level detection section 601 detects the scale of a received signal's Doppler frequency.

According to the Doppler frequency's scale detected in Doppler frequency level detection section 601, chip steering section 602 determines the width of chip steering as to the number of chips to shift, and performs chip steering with the determined width of chip steering. For instance, chip steering section 602 increases the width of chip steering as the Doppler frequency becomes small, and reduces the width of chip steering when the Doppler frequency is large. In this case, chip steering section 602 transmits a signal to inform the width of chip steering to the communication partner's wireless communication apparatus through radio transmission section 303.

As described above, the wireless communication apparatus of the preset embodiment is configured such that it specifies as to whether or not to perform chip steering, and transmits a signal that specifies the width of chip steering in attachment to a transmission signal, so that the wireless communication apparatus receiving this signal is able to perform inverse chip steering with the signal.

Incidentally, the wireless communication apparatus of the present embodiment can be combined with the wireless communication apparatus of Embodiment 3.

Moreover, the wireless communication apparatus of Embodiment 2 through Embodiment 5 are configured to transmit a signal indicating the presence/absence of chip steering processing, and so an inverse chip steering section on the receiving side of the wireless communication apparatus needs to be equipped with a function for performing inverse chip steering processing upon receiving a signal instructing to the effect of performing chip steering processing.

Embodiment 6

Figure 17:
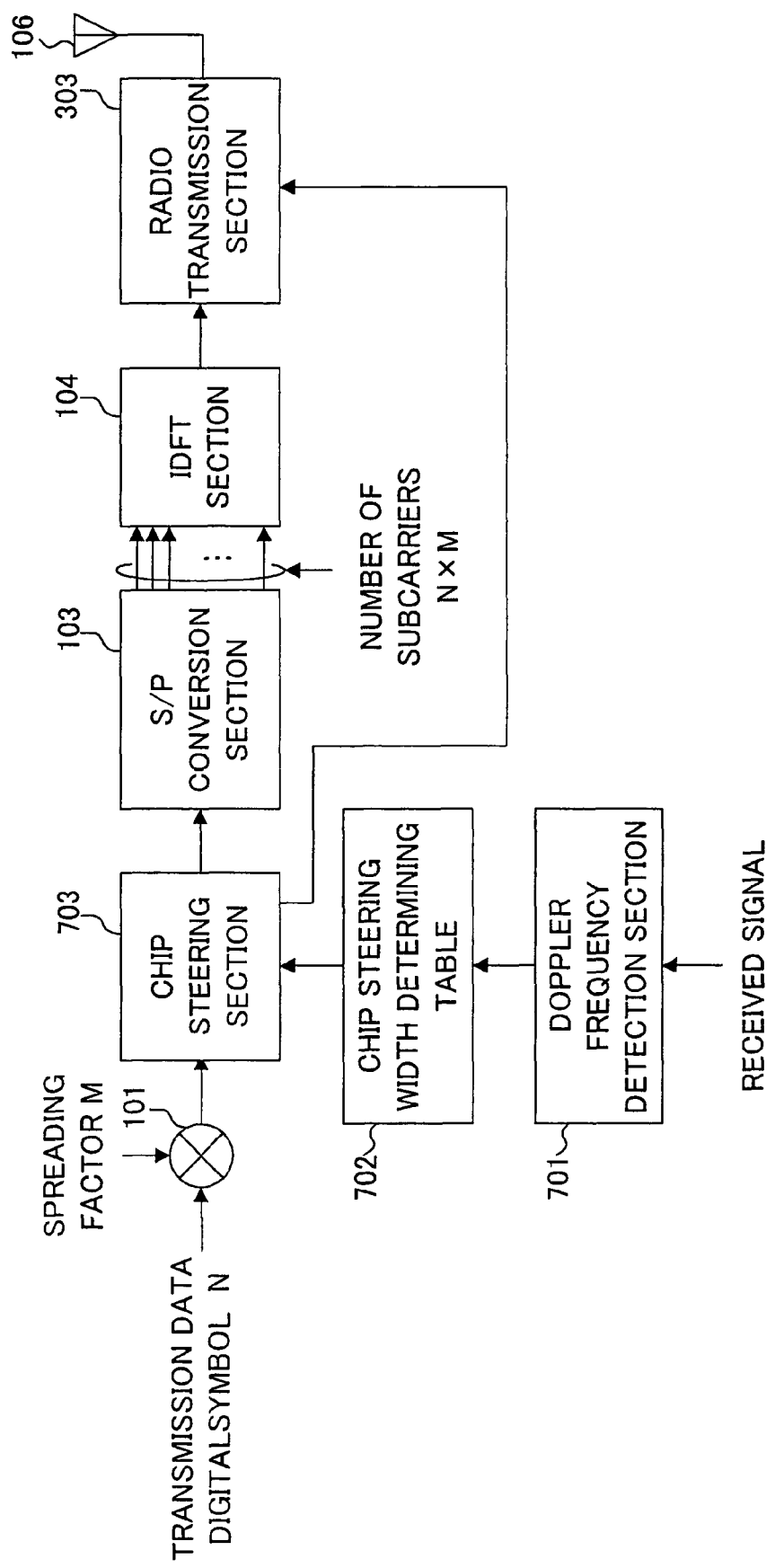
FIG. 17 is a block diagram showing an overview configuration of the transmitting side of the wireless communication apparatus according to Embodiment 6.

FIG. 17 is a block diagram showing an overview configuration of the transmitting side of the wireless communication apparatus of Embodiment 6. Parts identical to those in FIG. 7 and FIG. 14 are assigned the same codes as in FIG. 7 and FIG. 14 without further explanations thereof.

The wireless communication apparatus of FIG. 17 comprises a Doppler frequency detection section 701 and a chip steering width determining table 702, and a chip steering section 703, and differs from the wireless communication apparatus of FIG. 7 in determining the width of chip steering using a table that lists Doppler frequencies with corresponding chip steering widths.

Doppler frequency detection section 701 detects the Doppler frequency of a received signal. Chip steering width determining table 702 is a table listing corresponding Doppler frequencies and chip steering widths. Chip steering width determining table 702 outputs the chip steering width corresponding to the Doppler frequency detected in Doppler frequency detection section 701 to chip steering section 703.

Chip steering section 703 determines the chip steering width with reference to chip steering width determining table 702 and performs chip steering by the determined chip steering width. In this case, chip steering section 703 transmits a signal informing the chip steering width to the communication partner's wireless communication apparatus through radio transmission section 303.

As described above, according to the wireless communication apparatus of the present embodiment, the optimum chip steering width is determined in accordance with changes in the Doppler frequency caused by variations in fading with received signals, thereby minimizing the occurrence of burst-type errors.

Moreover, according to the wireless communication apparatus of the present embodiment, a chip steering width is determined using a table that lists corresponding Doppler frequencies and chip steering widths, so that operations for determining the chip steering width can be omitted, thereby simplifying chip steering width determination.

Embodiment 7

Figure 18:
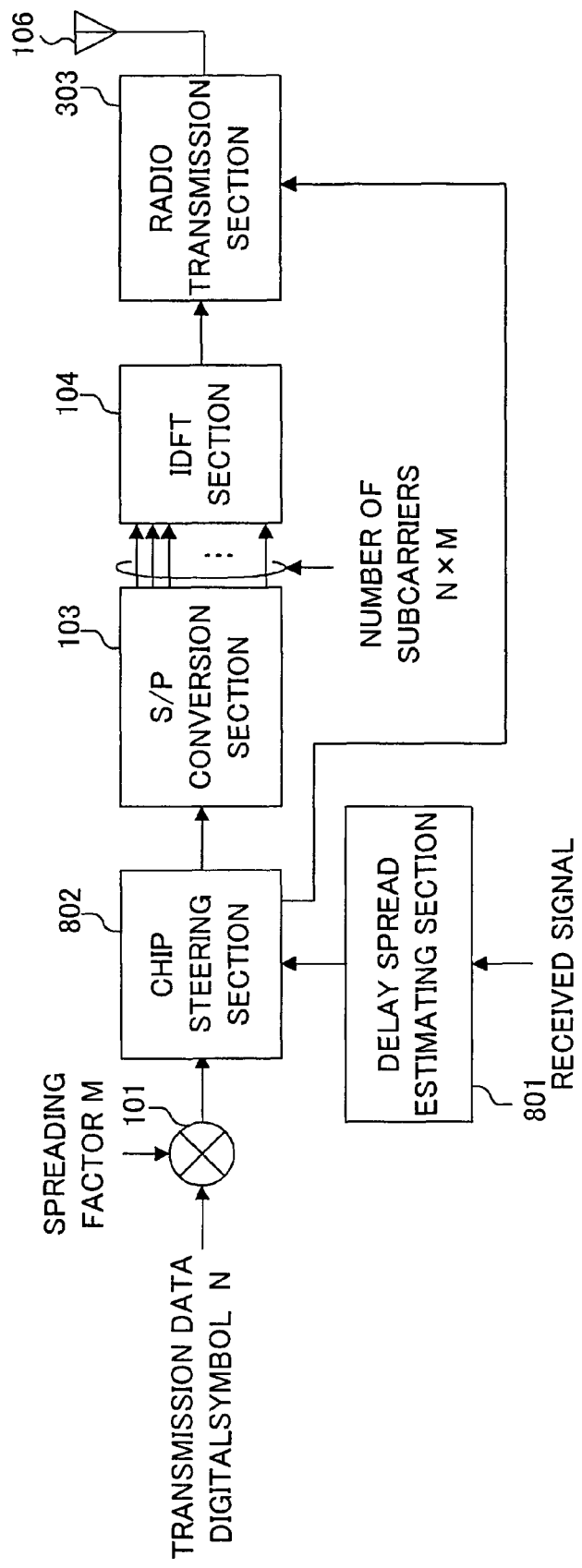
FIG. 18 is a block diagram showing an overview configuration of the transmitting side of the wireless communication apparatus according to Embodiment 7.

FIG. 18 is a block diagram showing an overview configuration of the transmitting side of the wireless communication apparatus of Embodiment 7. Parts identical to those in FIG. 7 and FIG. 14 are assigned the same codes as in FIG. 7 and FIG. 14 without further explanations thereof.

The wireless communication apparatus of FIG. 18 comprises a delay spread estimating section 801 and a chip steering section 802, and differs from the wireless communication apparatus of FIG. 7 and FIG. 14 in determining the width of chip steering as to the number of chips to shift according to the scale of delay spread with received signals.

Delay spread estimating section 801 estimates the scale of delay spread with respect to received signals. For instance, delay spread estimating section 801 determines the scale of delay spread according the level difference between adjacent subcarriers in a received signal. In addition, the scale of delay spread can be estimated based on the cross correlation between a received known symbol and the replica thereof.

Chip steering section 802 determines the width of chip steering as to the number of chips to shift according to the scale of delay spread with a received signal and performs chip steering by this determined chip steering width. In case the spread of a delay is large, the frequency selectivity is storing and adjacent subcarriers are subject to varying channel fluctuations, and so even when the chip steering is small, the likelihood is high that the condition of the channel varies for every transmission unit.

In case of a small delay spread, the frequency selectivity is weak and adjacent subcarriers are subject to similar channel fluctuations, and so chip steering section 802 increases the chip steering width. In this case, chip steering section 802 transmits a signal that informs the chip steering width to the communication partner's wireless communication apparatus through radio transmission section 303.

The wireless communication apparatus of the present embodiment thus sets the optimum chip steering width according to the degree of delay spread due to variations in fading with received signals, thereby further minimizing the occurrence of burst errors.

Embodiment 8

Figure 19:
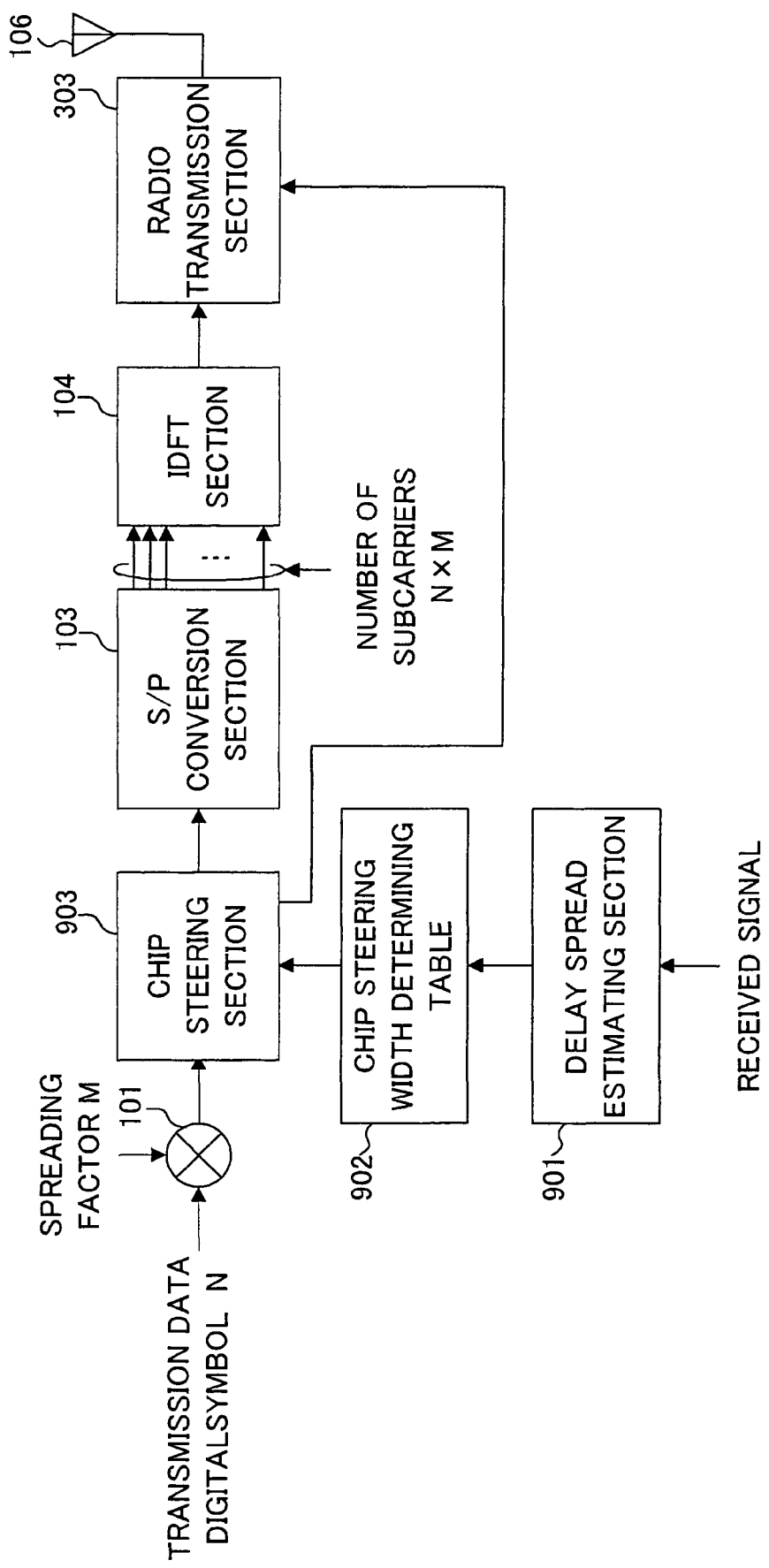
FIG. 19 is a block diagram showing an overview configuration of the transmitting side of the wireless communication apparatus according to Embodiment 8.

FIG. 19 is a block diagram showing an overview configuration of the transmitting side of the wireless communication apparatus of Embodiment 8. Parts identical to those in FIG. 7 and FIG. 14 are assigned the same codes as in FIG. 7 and FIG. 14 without further explanations thereof.

The wireless communication apparatus of FIG. 19 comprises a delay spread estimating section 901, a chip steering width determining table 902, and a chip steering section 903, with delay spread estimating section 901 estimating the scale of delay spread with received signals.

Chip steering width determining table 902 is a table that lists corresponding delay spread scales and chip steering widths. Chip steering width determining table 902 determines the chip steering width that corresponds to the scale of delay spread estimated in delay spread estimating section 901 to chip steering section 903.

Chip steering section 903 determines the chip steering width with reference to chip steering width determining table 902 and performs chip steering by the determined chip steering width. In this case, chip steering section 903 transmits a signal that informs the chip steering width to the communication partner's wireless communication apparatus through radio transmission section 303.

The wireless communication apparatus of the present embodiment thus sets the optimum chip steering width according to the degree of the spread of delay that occurs due to variations in fading with received signals, thereby further minimizing the occurrence of burst errors.

Moreover, according to the wireless communication apparatus of the present embodiment, a chip steering width is determined using a table that lists corresponding Doppler frequencies and chip steering widths, so that operations for determining the chip steering width can be omitted, thereby simplifying chip steering width determination.

In addition, the wireless communication apparatus of Embodiment 6 through Embodiment 8 are configured to transmit a signal indicating the chip steering width, and so an inverse chip steering section on the receiving side of the wireless communication apparatus needs to be equipped with a function for performing, upon receiving the signal informing the width of chip steering, inverse chip steering processing by this chip steering width.

In addition, although Embodiment 1 through Embodiment 8 above adopt OFDM for the multicarrier transmission scheme, this should not be construed as limiting, and other schemes can be employed as well.

As made obvious with the description presented above, according to the present invention, it is possible to provide a wireless communication apparatus and a wireless communication method that can minimize the occurrence of burst errors even when multi-path causes fading with relatively small temporal variations in the fading.

This application is based on Japanese Patent Application No. 2001-204943 filed on Jul. 5, 2001, entire content of which is expressly incorporated by reference herein.

INDUSTRIAL APPLICABILITY

The present invention relates to a wireless communication apparatus for use in digital communication systems, and more particularly, the present invention suits for use with a wireless communication apparatus that combines a multi-carrier modulation scheme such as an OFDM modulation scheme with a CDMA scheme to perform communication.

The invention claimed is:

1. A wireless transmission apparatus comprising:
a spreading section that spreads one or more digital symbols to generate chips;
a chip steering section that performs chip steering to shift a position of each chip in one serial chip sequence comprising all of the chips generated from the one or more digital symbols to be transmitted as one multicarrier signal; and
a generating section that generates the multicarrier signal by allocating the shifted chips to different subcarriers, wherein:
said chip steering section shifts the position of each chip by rotating positions of all of the chips included in the serial chip sequence, and
said chip steering section gradually increases, by the chip steering, a shift amount in the serial chip sequence for every consecutively generated multicarrier signal while maintaining an amount of increase in the shift amount constant.

2. The wireless transmission apparatus according to claim 1, wherein said chip steering section performs the chip steering when a scale of temporal variation in fading is less than a predetermined value.

3. The wireless transmission apparatus according to claim 1, further comprising:
an envelope fluctuation detection section that detects an envelope fluctuation of a pilot carrier of a received signal, wherein
said chip steering section performs the chip steering when a scale of temporal variation in fading estimated from the envelope fluctuation is less than a predetermined value.

4. The wireless transmission apparatus according to claim 3, wherein said envelope fluctuation detection section detects the envelope fluctuation by observing a number of samples of the envelope of the pilot carrier.

5. The wireless transmission apparatus according to claim 3, wherein said envelope fluctuation detection section detects the envelope fluctuation from a slope of the envelope of the pilot carrier.

6. The wireless transmission apparatus according to claim 1, further comprising:
a Doppler frequency detection section that detects a Doppler frequency of a received signal, wherein
said chip steering section performs the chip steering when a scale of temporal variation in fading estimated from the Doppler frequency is less than a predetermined value.

7. The wireless transmission apparatus according to claim 6, wherein said Doppler frequency detection section detects the Doppler frequency from a measurement result in a speed measurement section.

8. The wireless transmission apparatus according to claim 6, wherein said Doppler frequency detection section detects the Doppler frequency based on a fluctuation element of a channel estimation value estimated from known signals respectively corresponding to a plurality of received symbols.

9. The wireless transmission apparatus according to claim 1, wherein said chip steering section changes the shift amount in accordance with a scale of Doppler frequency, the wireless transmission apparatus further comprising a table that lists the Doppler frequency and the shift amount in a table form, wherein said chip steering section determines the shift amount with reference to said table.

10. The wireless transmission apparatus according to claim 1, wherein said chip steering section changes the shift amount in accordance with a scale of delay spread of a received signal, the wireless transmission apparatus further comprising a table that lists the delay spread and the shift amount in a table form, wherein said chip steering section determines the shift amount with reference to said table.

11. The wireless transmission apparatus according to claim 1, wherein said chip steering section changes the shift amount in accordance with a scale of delay spread estimated based on a level difference between adjacent subcarriers in a received signal or in accordance with a scale of delay spread estimated based on a cross correlation between a received known symbol and a replica thereof.

12. The wireless transmission apparatus according to claim 1, further comprising a transmission section that attaches a signal specifying the shift amount to a transmission signal.

13. A communication terminal apparatus comprising the wireless transmission apparatus according to claim 1.

14. A base station apparatus comprising the wireless transmission apparatus according to claim 1.

15. A wireless reception apparatus comprising:
an extracting section that extracts one serial chip sequence comprising all chips allocated to different subcarriers in one received multicarrier signal;
an inverse chip steering section that performs inverse chip steering to shift a position of each chip in the extracted serial chip sequence; and
a despreading section that despreads the shifted chips, wherein:
said inverse chip steering section shifts the position of each chip by rotating positions of all of the chips included in the extracted serial chip sequence, and
said inverse chip steering section gradually increases, by the inverse chip steering, a shift amount in the extracted serial chip sequence for every consecutively received multicarrier signal while maintaining an amount of increase in the shift amount constant.

16. A communication terminal apparatus comprising the wireless reception apparatus according to claim 15.

17. A base station apparatus comprising the wireless reception apparatus according to claim 15.

18. A wireless transmission method comprising:
spreading one or more digital symbols to generate chips;
performing chip steering to shift a position of each chip in one serial chip sequence comprising all of the chips generated from the one or more digital symbols to be transmitted as one multicarrier signal; and
generating the multicarrier signal by allocating the shifted chips to different subcarriers, wherein:
the shifting of the position of each chip is performed by rotating positions of all of the chips included in the serial chip sequence, and
said chip steering gradually increases a shift amount in the serial chip sequence for every consecutively generated multicarrier signal while maintaining an amount of increase in the shift amount constant.

19. A wireless reception method comprising:
extracting one serial chip sequence comprising all chips allocated to different subcarriers in one received multicarrier signal;
performing inverse chip steering to shift a position of each chip in the extracted serial chip sequence; and
despreading the shifted chips, wherein:
the shifting of the position of each chip is performed by rotating positions of all of the chips included in the serial chip sequence, and
said inverse chip steering gradually increases a shift amount in the serial chip sequence for every consecutively received multicarrier signal while maintaining an amount of increase in the shift amount constant.

* * * * *